No. 847,160. PATENTED MAR. 12, 1907.
A. E. CHAPMAN.
FLUME GATE.
APPLICATION FILED JAN. 2, 1907.

Witnesses.
Virgil Asher.
W. J. Anderson.

Inventor.
Alonzo E. Chapman.

UNITED STATES PATENT OFFICE.

ALONZO E. CHAPMAN, OF REDLANDS, CALIFORNIA.

FLUME-GATE.

No. 847,160.  Specification of Letters Patent.  Patented March 12, 1907.

Application filed January 2, 1907. Serial No. 350,425.

*To all whom it may concern:*

Be it known that I, ALONZO E. CHAPMAN, a citizen of the United States, residing at Redlands, in the county of San Bernardino and State of California, have invented a new and useful Flume-Gate, of which the following is a specification.

This invention relates to flume-gates; and its main object is to provide an improved flume-gate that is practically non-leakable when closed and to work freely under all conditions.

A further object is to provide an improved flume-gate with a stop, so that the gate is not liable to be pulled out and lost or cause inconvenience.

Figure 2:
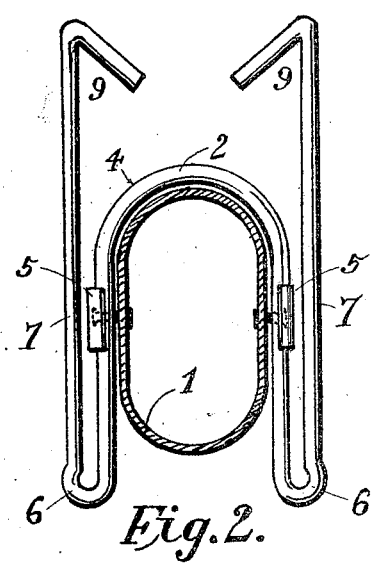
Figure 3:
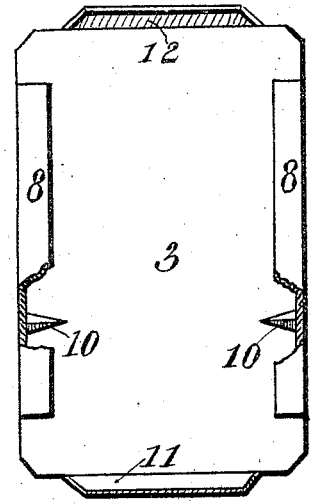
Figure 1:
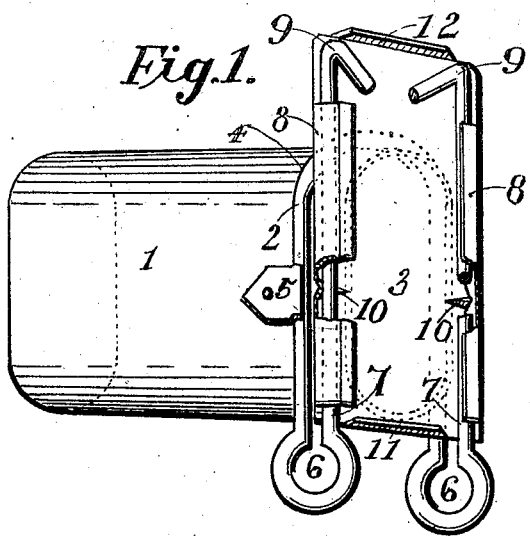

In the accompanying drawings, Figure 1 is a perspective view of flume-gate. Fig. 2 is an end view with gate removed. Fig. 3 is a view of gate.

The flume-gate consists of a tube 1, a wire 2, secured thereon, and a gate 3 to slide in spring-guides 7 7, formed by the bent wire 2.

The wire 2 is bent in a loop 4 to fit over the tube 1, so that it may be readily secured thereon, as at 5. Where each end of the wire 2 passes below the tubing 1, a loop 6 6 is formed in it for the purpose of forming a spring for the guides 7 7, formed by a further extension of the ends of the wire 2, and to hold the gate 3 firmly against the end of the tube 1 and prevent leakage when the gate 3 is in a closed position and to retain it in the various positions it may be placed in, controlling the quantity of water-flow that may be desired. The spring-guides 7 7 are formed by a further extension of the ends of the wire 2, and these, in conjunction with the U-shape bend on each side of the gate 3, as shown at 8 8, and with central projections 10 10 on body of gate 3, hold gate 3 in position against the end of the tube 1, allowing it to be moved freely up or down, as may be desired, to allow a larger or smaller opening through which the water may pass or flow. At the upper end of one of the spring-guides 7, formed with the wire 2, (or both 7 7, if so desired,) a bend is made downward, forming a hook 9, (or hooks 9 9.) This, in connection with the lip 11, bent out at the lower end of gate 3, forms a stop, so that when the gate 3 is raised to a full opening the point (or points) of the wire hook 9 (or hooks 9 9) comes in contact with the lip 11, retarding any further movement of the gate 3 in that direction and preventing the gate 3 from being entirely withdrawn with the danger of its being lost or destroyed or causing the annoyance and loss of time in replacing. The spring-guides 7 7 for gate 3 allow the gate 3 to be readily loosened from the end of tube 1 in case it should adhere from rust or other causes. In the operation of this gate the tension of the springs hold it against the end of tube in such a manner that the tube acts as a scraper when the gate is raised or lowered.

A small bracket 5, riveted to tube 1, is shown as a means of securing or fastening wire 2 to the tube 1. The bracket or wire may be soldered to tube. (Not shown in drawing.)

The gate 3 has a lip 12 turned out on the upper end to form a projection to catch hold of in operating same. On each side of gate 3 a U-shaped bend is made, 8 8, forming a recess to work around the spring-guides 7 7, formed with wire 2, so that the gate 3 may be opened or closed and at the same time retain it in position against the end of tube 1, the U-shaped bends operating materially to strengthen the gate, which is usually formed of thin sheet metal. At lower end of gate 3 a lip 11 is turned out, and this, in conjunction with end of hook 9, (or hooks 9 9,) formed in wire 2, prevents the gate 3, from being entirely withdrawn, as previously described. Projections 10 10 are raised on each side of and near center of gate 3 where it works under spring-guides 7 7, the object of these being to bring the pressure of the spring-guides 7 7 against the center of the body of gate 3, by this means equalizing the pressure on said gate 3 against the end of tube 1 when in closed position, making it more secure against leakage, and simplifying the manufacture of the gate, as with their use exact alinement of guides 7 7 with end of tube 1 is not necessary.

What I claim is—

1. A tube for carrying water or liquids, a movable gate for control of flow, spring-guides of wire secured to the tube as a means of holding the gate in contact with the end of the tube, the sides of the gate bent to fit the wire guides to retain it in position.

2. A tube for carrying water or liquids, a movable gate for control of flow, spring-guides of wire secured to the tube as a means of holding the gate in contact with the end of the tube, the sides of the gate bent to fit the wire guides to retain it in position, and a projection on the upper end of one or both of the wire guides for purpose set forth.

3. A tube for carrying water or liquids, a movable gate for control of flow, spring-guides of wire secured to the tube as a means of holding the gate in contact with end of the tube, sides of the gate bent to fit the wire guides to retain it in position, a projection on upper end of one or both of the wire guides and a lip on lower part of the gate to engage such projection for purpose set forth.

4. A tube for carrying water or liquids, a movable gate for control of flow, spring-guides of wire secured to the tube as a means of holding the gate in contact with end of the tube, sides of the gate bent to fit the wire guides to retain it in position, projections raised on sides of the body of the gate near center to equalize the pressure of the gate against end of the tube, a projection on upper end of one or both of the wire guides and a lip on lower part of the gate to engage such projection for purpose set forth.

5. A tube for carrying water or liquids, a movable gate for control of flow, spring-guides of wire secured to the tube as a means of holding the gate in contact with end of the tube, loops bent in the wire to form springs for the guides, sides of the gate bent to fit the wire guides to retain it in position, projections raised on sides of the body of the gate near center to equalize the pressure of the gate against end of the tube, a projection on upper end of one or both of the wire guides and a lip on lower part of the gate to engage such projection for purpose set forth.

6. A tube for carrying water or liquids, a movable gate for control of flow, spring-guides of wire secured to the tube as a means of holding the gate in contact with end of the tube, loops bent in the wire to form springs for the guides, sides of the gate bent to fit the wire guides to retain it in position, projections raised on the sides of the body of the gate near center to equalize the pressure of the gate against end of the tube, a projection on upper end of one or both of the wire guides, and lips on upper and lower end of the gate for purposes herein set forth.

In testimony whereof I have hereunto set my hand, at Redlands, California, this 26th day of December, 1906.

ALONZO E. CHAPMAN.

In presence of—
 VIRGIL ASHER,
 W. J. ANDERSON.